May 29, 1951  F. M. LEWIS  2,555,044
DIFFERENTIAL MECHANISM
Filed Sept. 1, 1948  2 Sheets—Sheet 1
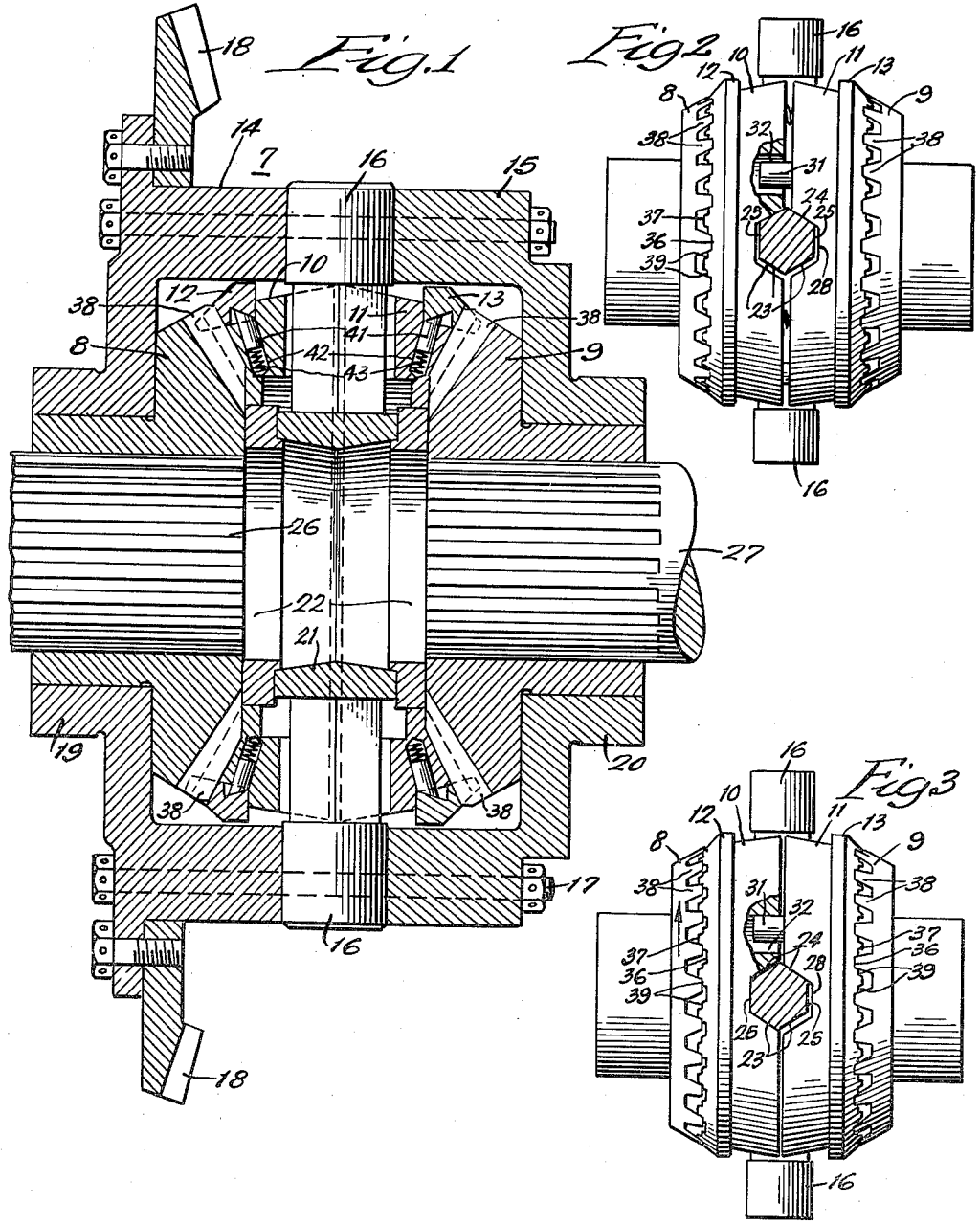
Inventor:
Frank M. Lewis,
By Soans Pond & Henderson
Attorneys.

May 29, 1951   F. M. LEWIS   2,555,044
DIFFERENTIAL MECHANISM
Filed Sept. 1, 1948   2 Sheets-Sheet 2

Inventor:
Frank M. Lewis,
By Swans, P and Henderson
Attorneys.

Patented May 29, 1951

2,555,044

UNITED STATES PATENT OFFICE 2,555,044

DIFFERENTIAL MECHANISM

Frank M. Lewis, Mount Clemens, Mich.

Application September 1, 1948, Serial No. 47,271

7 Claims. (Cl. 74—650)

The differential mechanism of practically every motor-driven vehicle, designed to permit one drive wheel to over-run the other on curves, presents the problem of getting the vehicle under way if one of the wheels has a traction condition materially less than that of the other wheel. The well-known "spinning" of one of the wheels is an inevitable consequence. Various attempts have been made to overcome this difficulty by constructing differentials which would deliver the driving power effectively to both wheels, yet allow for the imperative need for either of the wheels to over-run the other when the vehicle is rounding a curve. However, it would appear that, because of defects or limitations inherent therein, these prior constructions have met with little or no success as substitutes for the standard type of differential mechanism with which motor-driven vehicles normally are equipped.

The main objects of this invention, therefore, are to provide an improved form of differential mechanism for use with motor-driven vehicles which will deliver the power independently to each driving wheel but permit over-running of either wheel when the vehicle is rounding a curve; to provide a differential of this kind wherein the driving clutch element is automatically held retracted from driving relationship with either of the co-acting driven clutch elements so long as the torque or velocity of the respective wheel exceeds the torque or velocity of the driving member and wherein the clutch elements resume their normal driving relationship when the torque or velocity of the respective wheel has been overtaken by the torque or velocity of the driving member; and to provide a differential mechanism of this kind so constructed as to be conveniently substituted for the differential of the standard type with which practically all of the commercial motor-driven vehicles come equipped.

In the drawings:

Fig. 1 is a vertical sectional view of a preferred form of differential mechanism embodying this invention;

Fig. 2 is a reduced-scale, front elevation of this improved differential mechanism removed from its supporting and drive-producing housing and showing the position of the parts during the normal driving of both of the driven members by the driving member;

Fig. 3 is a similar view showing the relationship of the several parts when the torque or velocity of one of the driven members has exceeded the torque or velocity of the driving member;

Figure 4:
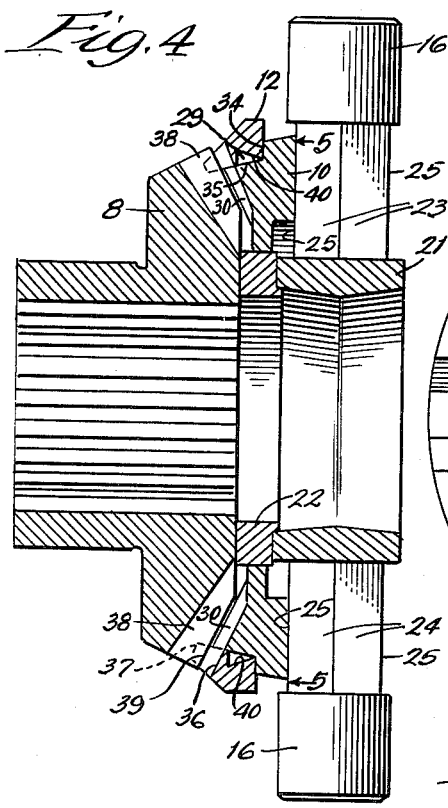
Fig. 4 is an enlarged vertical sectional view of the left portion of the assembly shown in Fig. 3.
Figure 5:
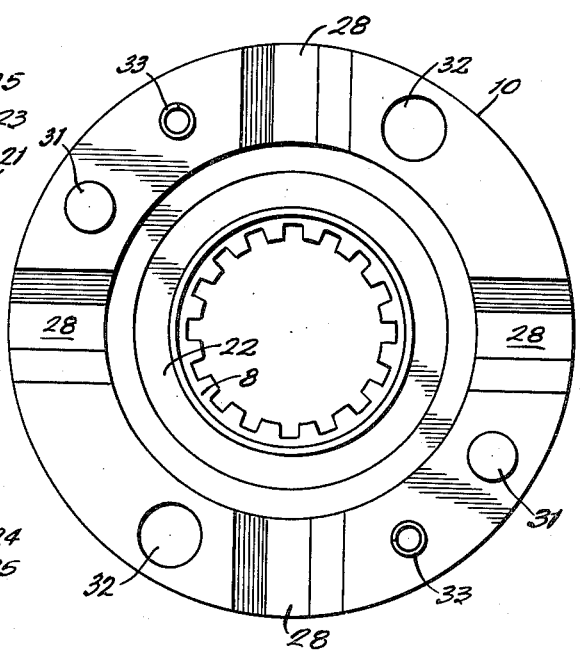
Fig. 5 is a vertical elevation taken on the line 5—5 of Fig. 4.

The preferred embodiment, constructed in accordance with this invention, comprises a main driving member 7 and a pair of driven members 8 and 9. The latter are adapted to be operatively connected with the former through the medium of clutch elements 10 and 11 wherewith are associated the disabling rings 12 and 13 which co-operate with the respective driven members 8 and 9 to disengage the clutch elements 10 and 11 from the respective driven members 8 and 9 when the torque or velocity of one of the driven members is caused to exceed the torque or velocity of the driving members 7.

The main driving member 7 is of a more or less conventional construction. As herein shown it comprises a pair of parts 14 and 15 between which and rotatably arranged therewith is a spider 16.

The parts 14 and 15 are secured in their assembled relationship by sets of bolts and nuts 17 and provide a housing for the other hereinbefore-described parts of the mechanism. A gear 18 is secured to the member 14 with which meshes a pinion (not shown) connected in the usual manner to the motor vehicle engine. As will be noted from the drawings the members 14 and 15 provide bearings 19 and 20 for the driven members 8 and 9.

Figure 6:
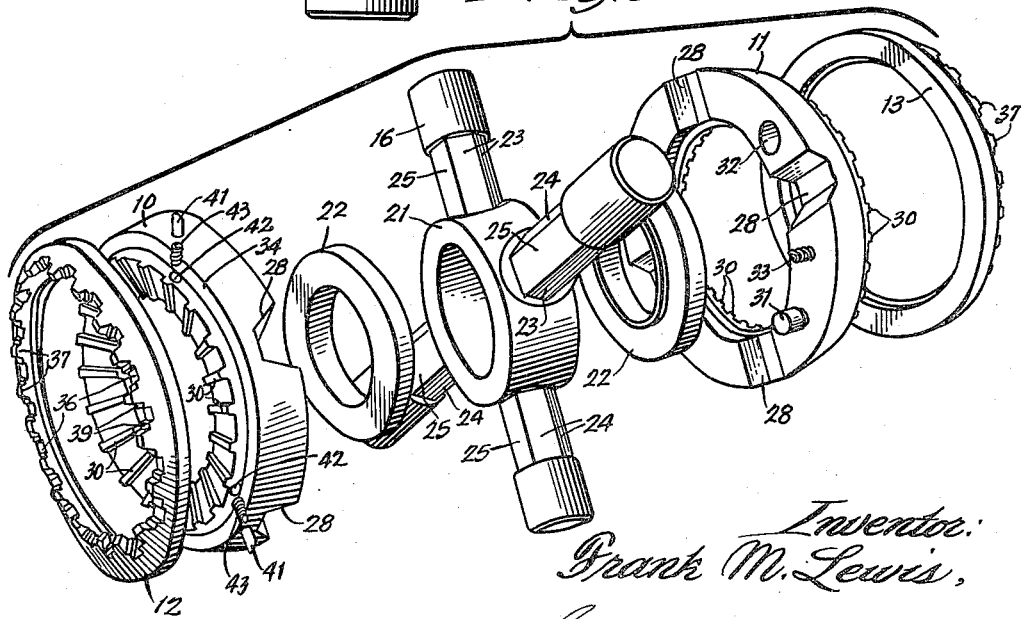
Fig. 6 is an exploded view of the several parts which go to make up that portion of the preferred form of differential shown in Figs. 2 and 3.

The driving-member spider 16, as is most clearly shown in Fig. 6, has a hub section 21 which is interposed between the ends of the driven members 8 and 9, and held in proper spaced relationship therefrom by flanged rings 22. Out from this hub section extend a plurality of radial arms the upper ends of which fit between the housing members 14 and 15. Each of the arms, intermediate the hub and the outer end thereof, is recessed to provide a pair of cam surfaces 23 and 24 which co-act with complementary surfaces on the clutch elements 10 and 11 to ensure the driving engagement of said clutch elements with the respective driven members 8 and 9, as will appear more fully hereinafter. The recesses 25 are formed on the spider arms merely for the purpose of clearance for the axial shifting of the clutch elements 10 and 11 relative to the spider 16, as will be set forth later.

The driven members 8 and 9 are herein shown in the form of gears. In fact these are the gears constituting a standard part of the differential mechanism regularly provided for the transport vehicle. As shown, these gears are keyed to shafts 26 and 27 on the ends of which are mounted the rear wheels (not shown) of the transport vehicle.

The clutch elements 10 and 11 are in the form of annuli recessed at 28 on one side to fit the cam surfaces 23 and 24, and the recess 25 of the arms of the spider 16, and recessed on the other side at 29 (Fig. 4) to support the rings 12 and 13. The outer faces of these clutch elements 10 and 11 are serrated to provide shallow teeth 30 capable of intermeshing with the teeth on the gears 8 and 9 to effect a driving relationship between the clutch elements 10 and 11 and the gears 8 and 9.

As will appear most clearly from Figs. 2 and 3 the recesses 28 are slightly larger than the recessed portions 23, 24, and 25 of the spider arms. This is to permit both a slight axial and a slight rotative movement of the clutch elements relative to the spider 16 for reasons which will appear more fully hereinafter.

On their opposed faces the clutch elements 10 and 11 are provided with pairs of diametrically-positioned pins 31 and recesses 32 and recessed springs 33.

The pair of pins and apertures on the respective clutch elements 10 and 11 are so positioned that when the clutch elements 10 and 11 are assembled on the spider 16 the pins 31 on one element are received in the apertures 32 on the opposite element. The recesses 32 are slightly larger than the pins 31 to permit but ultimately check slight relative rotation of the two clutch elements. The springs 33 normally urge these elements 10 and 11 axially outward to cause the engagement of the teeth 30 with the teeth of the driven gears 8 and 9.

The annular recess 29 on the clutch elements 10 and 11 is formed in the perimetrical portion of these elements which is opposed to the respective driven members 8 and 9. As most clearly shown in Figs. 1 and 4 the recess 29 is formed so as to provide an annular radially-disposed shoulder 34 and an axially-disposed outwardly-inclined ledge 35 against and on which is supported a ring 12 or 13.

The rings 12 and 13 have the perimetrical portions opposed to the driven members 8 and 9 formed with alternate depressions 36 and projections 37 in the nature of gear teeth to fit the gear teeth 38 on the driven members 8 and 9.

The depressions 36 are of a depth and a shape to receive the ends of the teeth 38 on the driven members 8 and 9 when the clutch elements 10 and 11 have their teeth 30 in intermeshing relationship with the teeth on said driven gears 8 and 9.

The projections 37 on the rings 12 and 13, although not necessarily so, are here shown to be shallower than the depressions between the teeth 38 on the gears 8 and 9. As is most clearly shown in Figs. 2 and 3, these projections 37 have their sides recessed intermediate the base and the crown thereof so as to provide shoulders 39 on each side of each of said projections and which are very slightly inclined to the axial plane of the rings. The function of such specially-formed projections 37 will be fully set forth in a following statement of operation.

The inner annular parts of the rings 12 and 13 opposed to the ledges 35 on the clutch elements 10 and 11 are recessed to provide axially-disposed inwardly-inclined surfaces 40. These surfaces are engaged by a plurality of tapered-end pins 41 located in recesses 42 formed in the ring ledges 35, which pins are pressed by springs 43 into engagement with the inclined ring surfaces 40. By means of these spring-pressed pins 41 the rings 12 and 13 are retained in rotative relationship with the respective clutch elements 10 and 11 even when such clutch elements are removed from association with the other parts of the mechanism.

The operation of this differential mechanism is substantially as follows:

Through the usual pinion (not shown) power is applied to the gear 18 which is communicated to the spider 16. The springs 33 normally hold the teeth 30 on the clutch elements 10 and 11 in mesh with the teeth on the driven gears 8 and 9. On a straightway operation of the motor vehicle the torque of the spider 16 so presses the cam surfaces 23 or 24 (depending upon the direction of rotation of the pider 16) on the arms of the spider against the complementary cam surfaces formed by the recesses 28 that the clutch elements 10 and 11 are held in driving engagement with the driven gears 8 and 9. Thus the driving force of the spider 16 is equally and independently applied to the shafts 26 and 27, and regardless of their relative traction conditions the two wheels mounted on the shafts 26 and 27 have to turn. Under such conditions the teeth 38 on the driving gears 8 and 9 are lodged in the depressions 36 on the rings 12 and 13, as most clearly shown in Fig. 2.

In the event the motor vehicle rounds a curve the driving force of the spider 16 will continue to be applied to the driven gear 8 or 9 for the inside wheel. The outside wheel will have its velocity accelerated over that of the inside wheel. As a consequence there will be a forward driving torque applied to the respective driven gear 8 or 9 greater than the torque of the spider 16. The resultant pressure of the teeth 38 on the gear 8 or 9 will have a camming action on the projections 37 below the shoulders 39 and move up onto the shoulders 39 with the result that the ring 12 or 13 will exert a pressure on the corresponding clutch element 10 or 11 forcing it axially inward against the action of the springs 33. At the same time the ring and clutch element will be given a slight rotative movement relative to the spider 16. The inward axial movement of the clutch element 10 or 11 will cause a disengagement of the teeth 30 from the gear teeth 38 and effect a disengagement of the driving relationship of the clutch element 10 or 11 and the respective driven gear 8 or 9. Such a relationship is shown in Fig. 3. This position of the parts will continue until the motor vehicle moves back into a straightway direction and the torque of the spider 16 again exceeds the torque of the erstwhile faster moving wheel.

When a clutch element 10 or 11 is thus forced axially inward its tendency toward rotative movement relative of the spider 16 is limited by the movement of the pins 31 in the recesses 32.

Variations and modifications in the details of structure and arrangement of the parts may be resorted to within the spirit and coverage of the appended claims.

I claim:

1. A differential mechanism of the class described comprising, a driving member, a pair of driven members, a pair of clutch elements mounted on said driving member for independent relative movement and rotation therewith but axially shiftable thereon into and out of driving engagement with the respective driven members, coacting means on said driving member and said clutch elements for limiting independent rotation of each of said clutch elements relative to said driving member and to each other coincident with the axial shifting thereof, yielding means normally urging said clutch elements into driving relationship with the respective driven members, a ring rotatably mounted on each of said clutch elements in opposed relationship to the respective driven members, and co-acting cam surfaces on the opposed faces of said rings and driven members adapted to permit the engagement of said clutch elements with their respective driven members when the torque of said driving member is uniform on both of said clutch elements but cause the axial separation of one of said clutch elements and its driven member when and so long as the torque on the respective driven member exceeds the torque of said driving member.

2. A differential mechanism of the class described comprising, a driving member, a pair of driven members, a pair of clutch elements mounted on said driving member for independent relative movement and rotation therewith but axially shiftable thereon into and out of driving engagement with the respective driven members, co-acting means on said driving member and said clutch elements for limiting independent rotation of each of said clutch elements relative to said driving member and to each other coincident with the axial shifting thereof, a ring rotatably mounted on each of said clutch elements in opposed relationship to the respective driven members, intermeshing projections on the opposed faces of said rings and driven members, the projections on each ring being recessed along their sides intermediate the crown and base thereof to form shoulders on each side of each of said ring projections, said projections co-acting when the torque of one of said driven members exceeds the torque of said driving member to shift the opposed ring and its associated clutch element axially inward thereby causing a disengagement of the respective clutch element from said driven member and to permit said driven member projections to engage said ring-projection shoulders so as to hold said ring and associated driven member in its axially retracted position so long as the torque of said driven member exceeds the torque of said driving member.

3. A differential mechanism of the class described comprising, a driving member, a pair of driven members, a pair of clutch elements mounted on said driving member for independent relative movement and rotation therewith but axially shiftable thereon into and out of driving engagement with the respective driven members, co-acting means on said driving member and said clutch elements for limiting independent rotation of each of said clutch elements relative to said driving member and to each other coincident with the axial shifting thereof, springs normally urging said clutch elements into driving relationship with the respective driven members, a ring rotatably mounted on each of said clutch elements in opposed relationship to the respective driven members, intermeshing projections on the opposed faces of said rings and driven members, the projections on each ring being recessed along their sides intermediate the crown and base thereof to form shoulders on each side of each of said ring projections, said projections co-acting when the torque of one of said driven members exceeds the torque of said driving member to shift the opposed ring and its associated clutch element axially inward against the action of said springs thereby causing a disengagement of the respective clutch element from said driven member and to permit said driven member projections to engage said ring-projection shoulders so as to hold said ring and associated driven member in its axially retracted position so long as the torque of said driven member exceeds the torque of said driving member.

4. A differential mechanism of the class described comprising, a driving member, a pair of driven gears, a pair of clutch elements mounted on said driving member for independent relative movement and rotation therewith but axially shiftable thereon into and out of driving engagement with the respective driven gears, the faces of said clutch elements opposed to said gears being serrated to form teeth intermeshing with the teeth on said gears, co-acting means on said driving member and said clutch elements for limiting independent rotation of each of said clutch elements relative to said driving member and to each other coincident with said axial shifting thereof, yielding means normally urging said clutch elements into driving relationship with said respective driven gears, a ring rotatably mounted on each of said clutch elements in opposed relationship to the respective driven gears, the perimetrical portions of said rings opposed to the respective driven gears being formed with gear teeth adapted to mesh with said driven gears, said ring gear teeth being recessed along their sides intermediate the crown and the base thereof to form shoulders on each side of each of said gear teeth, the teeth on said driven gears co-acting with the teeth on said rings when the torque of one of said driven gears exceeds the torque of said driving member to shift the opposed ring and its associated clutch element axially inward thereby causing a disengagement of the respective clutch element from said driven gear and to permit said driven-gear teeth to engage said ring-teeth shoulders so as to hold said ring and associated driven member in its axially shifted position so long as the torque of said driven gear exceeds the torque of said driving member.

5. A differential mechanism of the class described comprising, a driving member, a pair of driven members, a pair of clutch elements mounted on said driving member for independent relative movement and rotation therewith but axially shiftable thereon into and out of driving engagement with the respective driven members, co-acting means on said driving member and said clutch elements for limiting independent rotation of each of said clutch elements relative to said driving member and to each other coincident with the axial shifting thereof, yielding means normally urging said clutch elements into driving relationship with the respective driven members, said clutch elements having annular recesses formed on their perimetrical portions opposed to said driven members, a ring rotatably mounted in the annular recess of each of said clutch elements, and co-acting cam surfaces on the opposed faces of said rings and driven members adapted to permit the engagement of said clutch elements with their respective driven members when the torque of said driving member is uniform on both of said clutch elements but cause the axial separation of one of said clutch elements and its driven member when and so long as the torque on the respective driven member exceeds the torque of said driving member.

6. A differential mechanism of the class described comprising, a driving member, a pair of driven members, a pair of clutch elements mounted on said driving member for independent relative movement and rotation therewith but axially shiftable thereon into and out of driving engagement with the respective driven members, co-acting means on said driving member and said clutch elements for limiting independent rotation of each of said clutch elements relative to said driving member and to each other coincident with the axial shifting thereof, yielding means normally urging said clutch elements into driving relationship with the respective driven members, said clutch elements having annular recesses formed on their perimetrical portions opposed to said driven members, a ring rotatably mounted in the annular recess of each of said clutch elements, the inner face of each of said rings being annularly recessed to provide an axially-disposed inwardly-inclined surface, radially-disposed spring-pressed pins located in sockets in each of said rings with the outer ends of said pins tapered to engage said inclined surfaces on said rings and thereby hold said rings against displacement on said clutch elements and co-acting cam surfaces on the opposed faces of said rings and driven members adapted to permit the engagement of said clutch elements with their respective driven members when the torque of said driving member is uniform on both of said clutch elements but cause the axial separation of one of said clutch elements and its driven member when and so long as the torque on the respective driven member exceeds the torque of said driving member.

7. A differential mechanism of the class described comprising, a driving member, a pair of driven members, a pair of clutch elements mounted on said driving member for independent relative movement and rotation therewith but axially shiftable thereon into and out of driving engagement with the respective driven members, co-acting means on said driving member and said clutch elements for limiting independent rotation of each of said clutch elements relative to said driving member and to each other coincident with the axial shifting thereof, a ring rotatably mounted on each of said clutch elements in opposed relationship to the respective driven members, and co-acting cam surfaces on the opposed faces of said rings and driven members adapted to permit the engagement of said clutch elements with their respective driven members when the torque of said driving member is uniform on both of said clutch elements but cause the axial separation of one of said clutch elements and its driven member when and so long as the torque on the respective driven member exceeds the torque of said driving member.

FRANK M. LEWIS.

REFERENCES CITED

The following references are of record in the file of this patent:

UNITED STATES PATENTS

| Number | Name | Date |
|---|---|---|
| 1,286,362 | Lewis | Dec. 3, 1918 |
| 1,301,800 | Aichele | Apr. 29, 1919 |
| 1,430,744 | Lewis | Oct. 3, 1922 |
| 2,231,968 | Thornton | Feb. 14, 1941 |
| 2,329,059 | Knoblock | Sept. 7, 1943 |
| 2,397,673 | Lewis | Apr. 2, 1946 |